United States Patent [19]

Monreal

[11] Patent Number: 4,603,870
[45] Date of Patent: Aug. 5, 1986

[54] KNEELING OR SITTING SLED

[76] Inventor: F. Javier Monreal, 4242 Barker Hill Rd., Jamesville, N.Y. 13078

[21] Appl. No.: 751,599

[22] Filed: Jul. 2, 1985

Related U.S. Application Data

[63] Continuation-in-part of Ser. No. 615,116, May 30, 1984, abandoned.

[51] Int. Cl.$^4$ .............................................. B62B 13/04
[52] U.S. Cl. ...................................... 280/18; 441/65; D12/11
[58] Field of Search ............................. D12/6, 10, 11; 280/12 R, 12 B, 18, 21 R; 441/65

[56] References Cited

U.S. PATENT DOCUMENTS

| | | | |
|---|---|---|---|
| D. 170,887 | 11/1953 | Paden et al. | 280/12 B |
| D. 201,815 | 8/1965 | Greenberg | D12/11 |
| D. 280,308 | 8/1985 | Cashmere | D12/11 |
| 2,829,902 | 4/1958 | Stocker | 280/18 |
| 3,600,000 | 8/1971 | Bergstrom et al. | 280/18 |
| 3,635,490 | 1/1972 | Demaree et al. | 280/18 |
| 3,952,354 | 4/1976 | Turner | 280/18 X |
| 4,028,761 | 6/1977 | Taylor | 280/18 X |
| 4,524,984 | 6/1985 | Axelson | 280/18 |

Primary Examiner—John J. Love
Assistant Examiner—Michael Mar

[57] ABSTRACT

A recreational light weight snow sled of molded plastic sheeting 4' to 5' long and 15" to 24" wide with a contoured bottom or bed to accomodate the user in different positions, primarily kneeling and sitting. The kneeling position offers a firm knee hold without the need of straps due to a pair of symmetrical recessed knee pockets molded out of the bed of the sled hull. The sitting position, with the user at the rear of the sled, is possible due to the rear section of the sled bed being fairly flat, while the sides of the sled bed have slightly recessed longitudinal sections or lanes to accomodate both extended legs. Finally, if the user were to lay on the sled, he/she will have a smooth and wide unobstructed, slightly protrudent mid-longitudinal section or lane to rest the chest and abdomen.

1 Claim, 6 Drawing Figures

KNEELING OR SITTING SLED

BACKGROUND INFORMATION

This application is a continuation-in-part of Ser. No. 615,116 filed May 30, 1984, now abandoned.

The purpose of this invention is to provide a light weight snow sled for children, cheaply manufactured of molded plastic, with the advantage, over existing designs, patented or not, of allowing, not only the standard sitting or recumbent positions but also kneeling with a firm and secure hold of the knees.

Examination of current devices available in the market, and reasonably comparable in overall material, weight, shape and dimensions, reveals that they have an approximate scaphoid or flat row boat shape slightly pointed in the front with a more blunted rear and with a totally flat bottom so the child can sit to kneel or lay on his stomach or on his back. When he or she kneel, however, there is no contoured pocket or knee hold to make this position sufficiently stable. There are in the market other more contoured or shaped sleds meant for specific positions, particularly sitting, sleds that even have added braking or steering devices, but they are of heavier gauge and weight as a disadvantage to be dragged back up the slope, plus none of them allow the various positions that this invention provides.

Examination of prior art work reveals similar limitations in that the patented devices do not have the intent nor the feasibility of use in different positions. Since this proposed invention primarily introduces, over the existing flat bed sleds the contoured bottom for the purpose of Providing knee pockets, this inventor mentions here those patents that have been examined and which relate to kneeling sleds or skates or pads; D. F. Morgan's (U.S. Pat. No. 4,353,573) is, perhaps, the closest device to this proposed invention, but the arrangement of his "knee pockets" and the protruding foot stops, all meant for a pair of skis, not for a sled, does not make it suitable for other positions than kneeling. J. Taylor's device (U.S. Pat. No. 4,028,761) or "multipurpose slide", does allow other positions, but its minimally recessed knee-resting area is barely 1" deep and covered with a glued thick and firm foam pad, so for kneeling it does not offer any real knee pocket or knee hold; its only real hold depends solely on its over-the-thighs Velcro strap. Examination of G. F. Lake's (U.S. Pat. No. 3,689,092), F. T. Cooper's (U.S. Pat. No. 2,318,059), B. Gordon's (U.S. Pat. No. 2,448,427), G. Ramon (U.S. Pat. Nos. 3,025,526 and 3,112,812) and W. L. Brock's (U.S. Pat. 3,908,198), reveal equal limitations to one use or one position (i.e. kneeling) and/or they rely on straps as means to maintain control of the sliding device by the person.

BRIEF DESCRIPTION OF THE INVENTION

This invention provides a light weight children or recreational sled approximately 4' to 5' long and 15" to 24" wide, of scaphoid shape slightly pointed in the front and a more square rear made of one piece, firm but thin sheeting, preferably molded plastic, with up-sweeping 4" to 5" tall sides all around its periphery and with built-in moldings in its esentially flat bottom so as to allow two knee pockets on each side off the longitudinal center line and in the approximate mid section of the long hull. These two knee pockets bulge slightly below the bottom of the hull by about 1', and the protruding lips in front of each knee pocket is raised above the bottom of the hull 2" to 3" with a vertical, semirounded vertical wall or knee hold in the back of each protruding lip and a more softly tapered front. Thus, the depth of the knee pocket, from the top of its front lip to its bottom is approximately 3" to 4". A flat but protruding separation between the two knee pockets or rests runs from the rear of the sled towards its front, bulging upward highest at the center of the hull, between the two knee pockets, and lowest and wider at the two ends. This flat protrusion forms thus on its two lateral sides, two leg channels for the kneeling, sitting or even for the prone positions, and because it is flat, smooth and wide, and because it clears slightly above the two holding lips of the knee pockets, it still represents a relatively flat surface, from one end to the other, to permit the child to lay flat on it without the knee pockets built-in lips representing a sharp obstacle dangerous to the child.

DETAILED DESCRIPTION OF THE INVENTION

Figure 1:
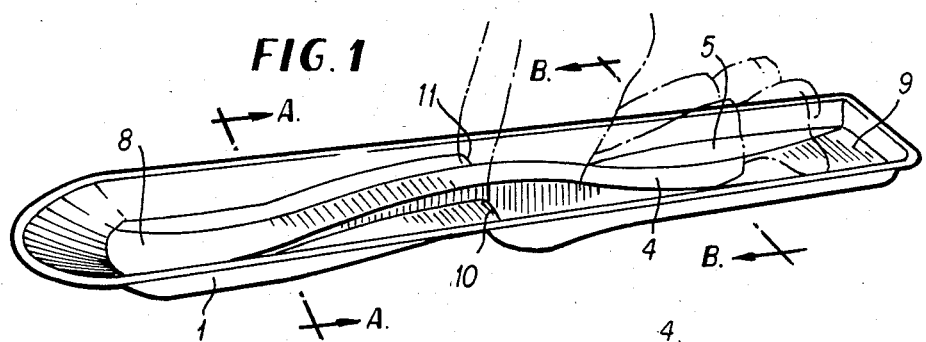
FIG. 1 is a left lateral perspective view of the instant invention with the user in the kneeling position (drawn in broken line).
Figure 2:
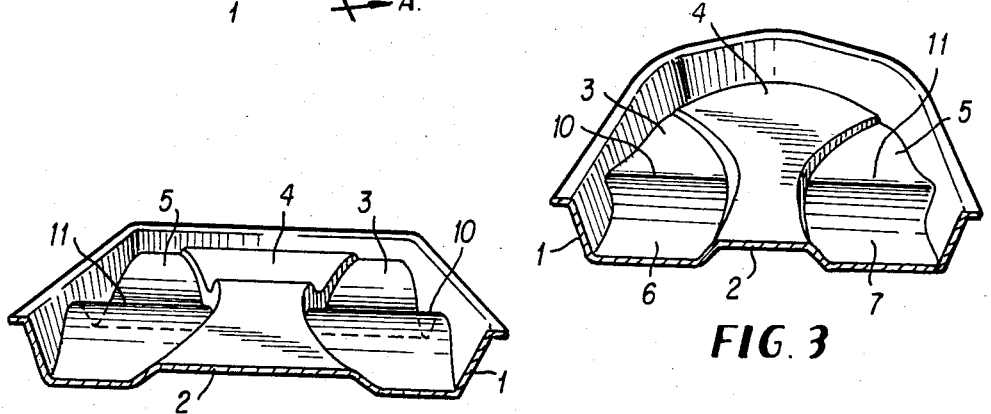
FIG. 2 is a view of the instant invention of FIG. 1 cross-sectioned by A—A and facing the rear portion from its front.
Figure 3:
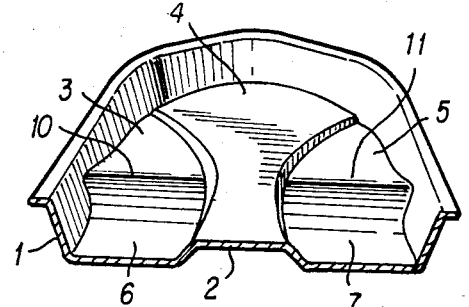
FIG. 3 is a view of the instant invention of FIG. 1 cross-sectioned by B—B and facing the front portion from its rear. It is narrower here than in FIG. 2.

This invention consists of a standard, commonly available recreational snow sled for children made of light plastic sheeting such as molded polyethylene, of an approximate scaphoid shape as a flat bed small river-row-boat with rounded contours, avoiding sharp edges, slightly pointed in the front and more square in its back end. Its approximate intended dimensions for children, as those flat sleds widely and cheaply available are 4' to 5' of length and 15" to 24" of width. Its outer edge, again as currently in widespread use, is curved up all around as the sides of a flat boat being this outer sides or edge of the sled 4" to 5" tall and identified in the figures by the numeral 1. This outer edge 1 is also curved outward as in FIGS. 2 and 3.

Figure 4:
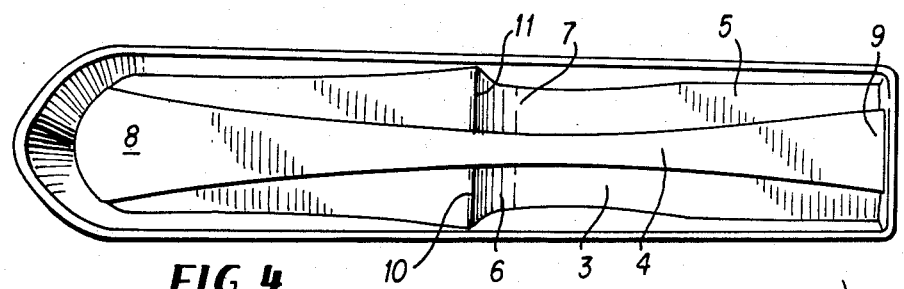
FIG. 4 is a top view of the instant invention of FIG. 1.

What makes this sled unique is its contoured bottom or bed identified in the two cross-sectioned figures by the numeral 2. This bottom 2 has three longitudinal "lanes" identified in FIG. 4 by the numerals 3, 4 and 5 respectively. The middle lane 4 is narrowest in its mid portion, approximately 4" to 6" narrow, and widest at the front and rear ends, both approximately 8" to 10" wide. This middle lane 4 is also raised over the two lateral lanes 3 and 5 by ½" to 1", except just behind the mid section of the sled where it appears raised over the two lateral lanes at the level of their knee pockets 4" to 5" as the middle lane 4 remains approximately flat or slightly humped but the two lateral lanes 3 and 5 sink down to form the knee pockets 6 and 7. The middle lane 4 just described has an approximately flat front. The front of the sled 8 to its rear 9 has, however, a very subtle upswept hump towards the middle of the sled being approximately 3" to 4" at its highest point which coincides with the front lip or knee hold 10 and 11 of the knee pockets 6 and 7 of each of the two lateral lanes 3 and 5 of the sled. The two lateral lanes 3 and 5 are a mirror image of one another correspondingly narrower at the front and rear ends and wider at their mid portion at the site described as knee pockets symmetrical areas. The width of these lower set lateral lanes 3 and 5 is approximately 3" to 4" at their two ends, and 4" to 6" at the knee pockets. As the obstacle-free and smoother middle lane, the anterior half of both lateral lanes is slightly upswept from the front to the point of the relatively sharp drop that starts two knee pockets. The point of sharp drop or lip, identified in the drawings for each lateral lane respectively by the numerals 10 and 11, just in front of each knee pocket, is thus approximately 3" to 4" higher, over the imaginary horizontal bottom line of the sled, than the front or forward part of the two lateral lanes 3 and 5. To avoid injuries in a collision or dismount, such front lip of each knee pocket should be reasonably smooth and possibly slightly rounded while maintaining a relatively sudden drop or sink into each knee pocket for the purpose of providing a good hold and embracing action upon each knee without the need of straps. From the said lip 10 or 11 in each lateral lane 3 and 5, to the deepest knee-resting area, the semi-vertical, but mildly knee-contoured rounded drop is 3" to 5". If the total front-to-back length of the sled is divided into four equal size quarters, the said holding lips 10 and 11 divide the 2nd and 3rd quarters while the knee-resting area of each lateral lane occupies the 3rd quarter. From the deepest part of the knee pockets, the two lateral lanes bed rises slowly so it is at the same horizontal level approximately at the 4th quarter of the sled and at the first quarter or front end. The overall contour of the knee pockets 6 and 7 is rounded and concave from front to back and also in cross section (i.e. from the prominence of the middle lane 4 to the lateral edge of the sled 1.

Figure 5:
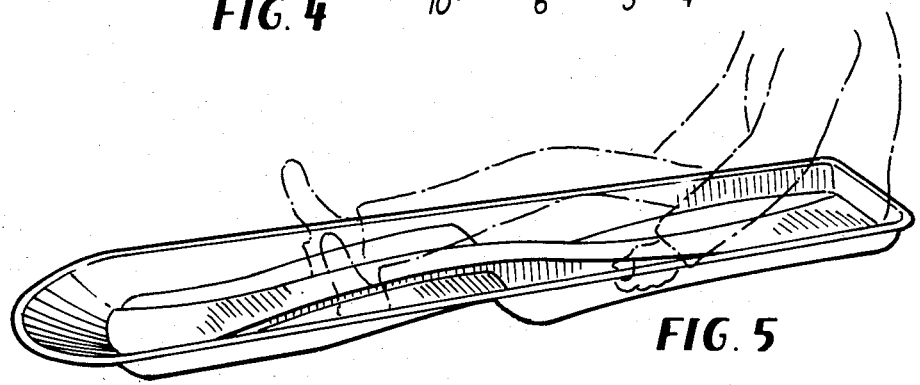
FIG. 5 is as FIG. 1 but with the user drawn in broken line in the sitting position.
Figure 6:
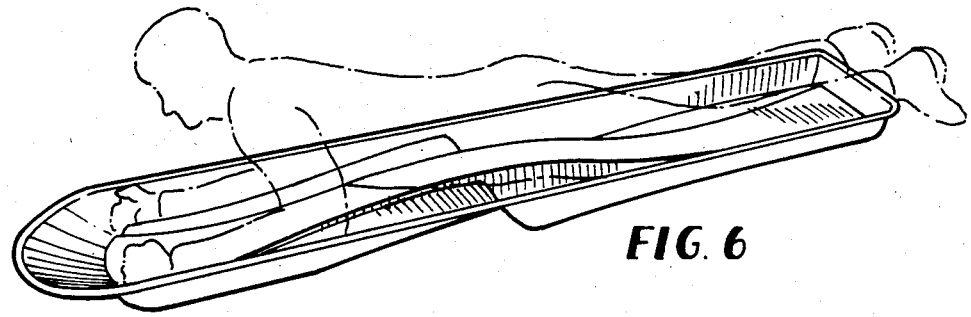
FIG. 6 is as FIG. 1 but with the user drawn in broken line laying on the sled.

Variations in the treatment of the corners, roundedness or squareness of the front end (drawn differently in FIGS. 3, 4 and 5) or in the inclination or out-curving of the outer edge, are considered only cosmetic and unimportant.

I claim:

1. A recreational lightweight snow sled comprising an elongated body molded from a single piece of plastic sheeting material and being four to five feet in length, fifteen to twenty four inches in width, and four to five inches in height, said sled having a bottom portion, a pair of longitudinally extending parallel side portions, a rear portion interconnecting the aft ends of said side portions, and a front portion interconnecting the front ends of said side portions, said front portion having a forwardly extending contoured shape, said bottom portion having a longitudinally extending middle section and a longitudinally extending lateral section along each side of said middle section, said middle section being eight to ten inches wide at each end and tapering to a width of four to six inches at its midpoint, said middle section being progressively curved upwardly from a lowest point at each end to a raised hump at its midpoint, said hump extending three to five inches above the bottom surface of the sled, each said lateral section being four to six inches wide at its midpoint and tapering to a width of three to four inches at each end, each said lateral section being progressively curved upwardly from its front end to its midpoint while remaining below the height of said middle section, and a knee pocket in the form of a curved depression located directly behind the midpoint of each lateral section and extending three to five inches below the highest point of said lateral section, said lateral section rising progressively upwardly from said knee pocket to the rear end of said lateral section while remaining below the height of said middle section, wherein said sled may accommodate a user while in a sitting position, a kneeling position, or a prone position.

* * * * *